UNITED STATES PATENT OFFICE 2,572,579

DISUBSTITUTED CARBAMIC ACID ESTERS OF 3 - HYDROXY - 1 - ALKYL - PYRIDINIUM SALTS

René Urban, Basel, Switzerland, assignor to Hoffmann-La Roche Inc., Nutley, N. J., a corporation of New Jersey No Drawing. Application May 18, 1946, Serial No. 670,838. In Switzerland July 26, 1945

5 Claims. (Cl. 260—295.5)

This invention relates to the manufacture of pyridinium compounds.

Salts of disubstituted carbamic acid esters of m-hydroxy-phenyl-trimethylammonium, such as, for instance, the dimethyl-carbamic acid ester of m-hydroxyphenyl-trimethylammonium-bromide, are known to be valuable medicinal preparations.

It has now been found, according to the present invention, that the salts of N,N-disubstituted carbamic acid esters of N-alkyl-3-hydroxy-pyridinium of the general formula:

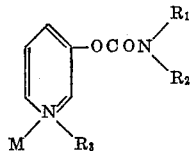

wherein $R_1$ and $R_2$ are alkyl, aryl or aralkyl radicals, $R_3$ stands for alkyl radicals, and M represents a halogen or an alkyl sulphate radical, possess similar physiological properties. The disubstituted carbamic acid esters of 3-hydroxypyridine were hitherto also unknown. They have a similar, though reduced, action as the quaternary compounds.

The N,N-disubstituted carbamic acid esters of 3-hydroxypyridine may be obtained by causing disubstituted carbamic acid chlorides to act on 3-hydroxypyridine. They can also be prepared by allowing phosgene to act on 3-hydroxypyridine and then reacting the resulting chloro-formic acid ester of 3-hydroxypyridine with a disubstituted amine. By addition of alkyl halides or dialkyl sulphates to these tertiary bases, the corresponding quaternary pyridinium salts are obtained which have the action of physostigmin, however without the disadvantages of this alkaloid.

The new salts are to be employed as medicinal preparations.

Example 1

12 parts by weight of dimethyl-carbamic acid chloride, dissolved in 20 parts by weight of xylol, are added dropwise to a boiling solution of 19 parts by weight of 3-hydroxypyridine in 120 parts by weight of xylol. Heating is continued under reflux for 3 hours. When the solution has cooled down, it is separated from the precipitated 3-hydroxypyridine hydrochloride and washed with water. After drying over sodium sulphate, the xylol is distilled off and the residue fractionated under reduced pressure. The N,N-dimethyl-carbamic acid ester of 3-hydroxypyridine distills at 148° C. under a pressure of 15 mm.

A solution of 20 parts by weight of methyl bromide in 30 parts by weight of acetone is added to a solution of 35 parts by weight of N,N-dimethyl-carbamic acid ester of 3-hydroxypyridine in 70 parts by weight of acetone. After standing for a lengthy period (1 or 2 days), the N,N-dimethyl-carbamic acid ester of 3-hydroxy-1-methyl-pyridinium-bromide separates. It can be recrystallised from absolute alcohol. The colourless, strongly hygroscopic crystals melt at 151–152° C. They are easily soluble in water, having a neutral reaction, fairly soluble in lower alcohols, difficultly soluble in acetone, and insoluble in ether and benzene.

Example 2

While stirring, a stream of phosgene is introduced into a suspension of 10 parts by weight of 3-hydroxypyridine in 30 parts by weight of chloroform until the chloroform is saturated with phosgene. 50% of the 3-hydroxypyridine goes into solution, the other 50% precipitates in the form of the hydrochloride. The mixture is evaporated to dryness, the residue added to 40 parts by weight of an approximately 30% solution of dimethyl-amine while stirring and the stirring continued for ½ hour. Thereupon the dimethyl-carbamic acid ester of 3-hydroxypyridine is extracted with ether and further worked up to the dimethyl-carbamic acid ester of 3-hydroxy-1-methyl-pyridinium-bromide as described in Example 1.

Example 3

10 parts by weight of 3-hydroxypyridine, dissolved in 40 parts by weight of pyridine, are slowly added to a boiling solution of 25 parts by weight of diphenyl-carbamic acid chloride in 45 parts by weight of pyridine. Boiling under reflux is continued for another hour. After cooling, the solution is separated from the precipitated pyridine-hydrochloride and concentrated to dryness. The residue is dissolved in dilute hydrochloric acid. The base is precipitated by the addition of soda solution. It is recrystallised from dilute alcohol. The N,N-diphenyl-carbamic acid ester of 3-hydroxypyridine forms colourless crystals melting at 113–114° C.

By addition of 10 parts by weight of dimethyl sulphate to a solution of 23 parts by weight of diphenyl carbamic acid ester of 3-hydroxypyridine in 50 parts by weight of acetone, the N,N-diphenyl-carbamic acid ester of 3-hydroxy- 1-methyl-pyridinium-methylsulphate is obtained. After recrystallisation from isopropyl-alcohol, it melts at 119–120° C. It is easily soluble in water and methanol, insoluble in acetone and ether. With methylbromide, the N,N-diphenyl-carbamic acid ester of 3-hydroxy-1-methyl-pyridinium-bromide of melting point 175–176° C. is obtained. This quaternary salt, too, is easily soluble in water, insoluble in acetone, benzene and ether.

If, instead of diphenyl-carbamic acid chloride, benzyl-phenyl-carbamic acid chloride is caused to act on 3-hydroxy-pyridine, and if methyl-bromide is added to the resulting tertiary base, N,N-benzyl-phenyl-carbamic acid ester of 3-hydroxy-1-methyl-pyridinium-bromide is obtained. This quaternary salt, which is oily, is easily soluble in water and alcohols, but insoluble in ether and acetone.

I claim:

1. Salts of N,N-disubstituted carbamic acid esters of N-alkyl-3-hydroxypyridinium of the general formula:

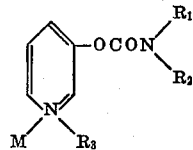

wherein $R_1$ and $R_2$ are selected from the group consisting of alkyl, aryl and aralkyl radicals, $R_3$ is selected from the group consisting of alkyl radicals, and M is selected from the group consisting of halogen and alkyl sulphate radicals.

2. N,N-dimethyl-carbamic acid ester of 3-hydroxy-1-methyl-pyridinium-bromide.

3. N,N-diphenyl-carbamic acid ester of 3-hydroxy-1-methyl-pyridinium-bromide.

4. N-phenyl-N-benzyl-carbamic acid ester of 3-hydroxy-1-methyl-pyridinium-bromide.

5. A N,N-dialkyl-carbamic acid ester of a 3-hydroxy-1-alkyl-pyridinium halide having the formula

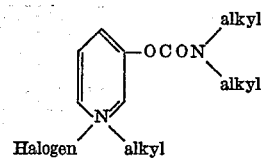

RENÉ URBAN.

REFERENCES CITED

The following references are of record in the file of this patent:

UNITED STATES PATENTS

| Number | Name | Date |
|---|---|---|
| 2,304,830 | Katzman | Dec. 15, 1942 |

OTHER REFERENCES

Journal Am. Chem. Soc., vol. 63, pp. 308–311 (1941).